US012790526B2

(12) United States Patent
D'Ignoti et al.

(10) Patent No.: US 12,790,526 B2
(45) Date of Patent: Nov. 10, 2026

(54) ADHESIVE COMPOSITION

(71) Applicant: ARKEMA FRANCE, Puteaux (FR)

(72) Inventors: Vincenzo D'Ignoti, Correggio (IT); Jie Wu, Lake Jackson, TX (US); Thorsten Schmidt, Richterswil (CH); Pierluigi Pisoni, Arconate (IT); Giancarlo Defilippi, Mozzate (IT); Tuoqi Li, Dallas, TX (US)

(73) Assignee: ARKEMA FRANCE, Puteaux (FR)

( * ) Notice: Subject to any disclaimer, the term of this patent is extended or adjusted under 35 U.S.C. 154(b) by 988 days.

(21) Appl. No.: 17/756,364

(22) PCT Filed: Nov. 4, 2020

(86) PCT No.: PCT/US2020/058830

§ 371 (c)(1),
(2) Date: May 24, 2022

(87) PCT Pub. No.: WO2021/108097

PCT Pub. Date: Jun. 3, 2021

(65) Prior Publication Data

US 2022/0396721 A1 Dec. 15, 2022

(30) Foreign Application Priority Data

Nov. 28, 2019 (IT) ........................ 102019000022356

(51) Int. Cl.

| | |
|---|---|
| ***C09J 175/04*** | (2006.01) |
| ***C08G 18/08*** | (2006.01) |
| ***C08G 18/12*** | (2006.01) |
| ***C08G 18/42*** | (2006.01) |
| ***C08G 18/71*** | (2006.01) |
| ***C08G 18/73*** | (2006.01) |
| ***C08K 5/544*** | (2006.01) |
| ***C09J 175/06*** | (2006.01) |

(52) U.S. Cl.

CPC ........ *C09J 175/04* (2013.01); *C08G 18/0852* (2013.01); *C08G 18/12* (2013.01); *C08G 18/718* (2013.01); *C08K 5/544* (2013.01); *C09J 2301/162* (2020.08); *C09J 2475/00* (2013.01)

(58) Field of Classification Search

None

See application file for complete search history.

(56) References Cited

U.S. PATENT DOCUMENTS

| | | | | |
|---|---|---|---|---|
| 4,889,768 | A | 12/1989 | Yokoshima et al. | |
| 8,178,645 | B2 | 5/2012 | Popa et al. | |
| 8,686,076 | B2 | 4/2014 | Li et al. | |
| 8,778,458 | B2 | 7/2014 | Nagelsdiek et al. | |
| 8,907,014 | B2 | 12/2014 | Vyakaranam et al. | |
| 10,125,156 | B2 | 11/2018 | Albert et al. | |
| 10,208,153 | B2 | 2/2019 | Shah et al. | |
| 10,221,346 | B2 | 3/2019 | Suen | |
| 11,008,490 | B2 | 5/2021 | Wu et al. | |
| 11,015,093 | B2 | 5/2021 | Bai et al. | |
| 2003/0129397 | A1 | 7/2003 | Wilson et al. | |
| 2005/0113498 | A1 | 5/2005 | Auerbach | |
| 2006/0127681 | A1 | 6/2006 | Domes et al. | |
| 2006/0276644 | A1 | 12/2006 | Childress et al. | |
| 2008/0293908 | A1 | 11/2008 | Ludewig et al. | |
| 2009/0233033 | A1 | 9/2009 | Griswold | |
| 2010/0234502 | A1 | 9/2010 | Iwasaki et al. | |
| 2011/0052809 | A1 | 3/2011 | Huck et al. | |
| 2015/0191625 | A1* | 7/2015 | Lomoelder .......... | C08G 18/778 524/91 |
| 2016/0152880 | A1 | 6/2016 | Ohara et al. | |
| 2016/0280978 | A1 | 9/2016 | Kamai et al. | |
| 2017/0240689 | A1* | 8/2017 | Kramer ................ | C08G 18/227 |
| 2019/0169476 | A1 | 6/2019 | Mennecke et al. | |
| 2021/0230465 | A1 | 7/2021 | Xie et al. | |
| 2022/0235172 | A1 | 7/2022 | Colin | |

FOREIGN PATENT DOCUMENTS

| | | | | |
|---|---|---|---|---|
| CN | 101189246 | A | | 5/2008 |
| CN | 101805366 | A | | 8/2010 |
| CN | 102146275 | A | * | 8/2011 |
| CN | 104449533 | A | | 3/2015 |
| EP | 1216263 | B1 | | 10/2003 |
| EP | 3372609 | A1 | | 9/2018 |
| JP | 2004-306368 | A | | 11/2004 |
| JP | 2008019361 | A | * | 1/2008 |
| JP | 2010215715 | A | | 9/2010 |
| JP | 2011-001484 | A | | 1/2011 |
| JP | 2012-102154 | A | | 5/2012 |
| JP | 2013221079 | A | * | 10/2013 |
| JP | 2017-043693 | A | | 3/2017 |
| KR | 20100115225 | A | | 10/2010 |
| TW | 201945503 | A | | 12/2019 |
| WO | 2007037368 | A1 | | 4/2007 |
| WO | 2007/050538 | A2 | | 5/2007 |

(Continued)

OTHER PUBLICATIONS

PCT/US2020/058830, International Search Report and Written Opinion with a mailing date of Feb. 16, 2021.

*Primary Examiner* — Ha S Nguyen

(74) *Attorney, Agent, or Firm* — Gemini Law LLP

(57) ABSTRACT

A laminating adhesive composition for use in producing a laminate structure for retort applications including a mixture of: (A) at least one isocyanate component as Component A; and (B) at least one isocyanate-reactive component as Component B; wherein the at least one isocyanate-reactive component, Component B, comprises (Bi) at least one silyl polymer, and (Bii) at least one polyol compound; and a laminate structure made using the above laminating adhesive composition.

11 Claims, No Drawings

(56) References Cited

FOREIGN PATENT DOCUMENTS

| | | | |
|---|---|---|---|
| WO | 2010008154 | A2 | 1/2010 |
| WO | 2017/204014 | A1 | 11/2017 |
| WO | 2019212625 | A1 | 11/2019 |

* cited by examiner

ADHESIVE COMPOSITION

FIELD

The present invention relates to an adhesive composition including an isocyanate component and an isocyanate-reactive component; and more specifically, the present invention relates to a solvent-based laminating adhesive composition wherein the isocyanate-reactive component includes at least one silyl polymer and at least one polyol compound (a hydroxyl group-containing compound). The adhesive composition is particularly useful for retort applications.

BACKGROUND

Heretofore, various two-component (2K) type polyurethane (PU) adhesive compositions have been produced for use in various applications. As is known in the art, 2K PU compositions are based on the reaction mixture of an isocyanate component, such as a polyisocyanate compound; and an isocyanate-reactive component such as a polyol compound; and such 2K PU compositions have long been used as adhesives for producing laminates. When the two components (e.g., the polyisocyanate and polyol) are mixed, the polyisocyanate and polyol react to form a cured polyurethane adhesive; and the reaction can form a strong adhesive bond to bind many types of films and substrates together.

A solvent-based polyurethane adhesive composition containing an adhesion promoter is known to be useful as an adhesive composition for retort applications. The common adhesion promoters used for food packaging in "high performance" applications (e.g., retort applications) are based on epoxy-silane. Recent government announcements (e.g., from the EU commission) are alerting the adhesive industry that the adhesion promoters based on epoxy-silane and/or similar derivates have a potential mutagenicity; and in the near future, this family of adhesion promoters could be banned or restricted by EU regulations. As a consequence, banning the use of epoxy-silane as an adhesion promoter in an adhesive composition; and the absence of the epoxy-silane as an adhesion promoter in an adhesive composition, may cause difficulties in the adhesive composition achieving the required performance for laminates made from such adhesive composition, particularly for use in high performance or retort applications. It is therefore desired to provide an alternative adhesive composition and/or an alternative adhesion promoter that can be used in high performance or retort applications; and that will perform as well as, or better than, known epoxy-silane promoters.

While there have been some advances in the art regarding 2K polyurethane adhesive compositions for use in a variety of applications, there is still room for developments in the art of adhesives. In particular, there is still a desire to provide a lamination adhesive composition exhibiting enhanced properties of, for example, bond strength, moldability, and heat resistance such that the adhesive composition can properly be used for producing, for example, a foil-based composite laminated film structure and lamination article or product for use, not only in flexible food packaging applications in general, but also for use in retort applications.

SUMMARY

One of the objectives of the present invention is to provide an adhesive composition designed for use in retort applications and in other applications similar to retort applications.

The present invention described herein relates to the preparation and use of an adhesive composition which is of utility to prepare a thin multi-layer film flexible laminate based on two or more films; for example, a metal foil-based laminate structure with polypropylene (PP), polyethylene (PE) or co-polymers based upon propylene or ethylene as a sealant layer; a four-ply structure with an outside layer of polyethylene terephthalate (PET), a first top middle layer of a metal foil, a second bottom middle layer of Nylon, and an inside layer of casted polypropylene (CPP). The formed laminate needs to be capable of maintaining performance characteristics which permits the film laminate to withstand retort processing conditions (e.g., 121° C. for 1 hr to 2 hr; 132° C. for 30 min to 45 min; and/or 135° C. for 30 min to 45 min) with minimal decrease of bond strength performance. The adhesive composition of the present invention has utility for use in, for example, food pouches, ready to eat meals, can coatings, and the like.

In one embodiment, the present invention includes a silane-modified polymer or silyl polymer based on the reaction product of: (α) at least one polyol compound (for example, at least one polyester polyol); and (b) at least one iso-silane compound to form a "partial silyl polymer" (herein abbreviated "PSP").

In another embodiment, the present invention includes a silane-modified polymer or silyl polymer based on the reaction product of: (i) the aforementioned PSP; and (ii) at least one amino silane compound to form a "final silyl polymer" (herein abbreviated "FSP").

In still another embodiment, the present invention relates to a process which includes (I) pre-forming the PSP in a first reaction step and then (II) reacting, in a second step, the PSP of the first step with an amino-silane, and/or derivates thereof.

In yet another embodiment, the present invention includes an adhesive composition including a mixture of: (A) at least one isocyanate component; and (B) at least one an isocyanate-reactive component; wherein the at least one an isocyanate-reactive component includes (Bi) a silyl polymer such as the above PSP and/or the above FSP, and (Bii) at least one polyol compound.

In even still another embodiment, the present invention includes a laminate including: (α) at least one first layer (primary layer) of a film or a substrate; (β) at least one second layer (secondary layer) of a film or a substrate; and (γ) at least one layer of the above adhesive composition for binding the first and second layers together; wherein the adhesive composition is disposed on at least a portion of the surface of one side of: (1) the first layer, (2) the second layer, or (3) both the first layer and the second layer.

In even yet another embodiment, the present invention includes a retort article made from the above-described laminate.

In a preferred embodiment, the present invention includes a process of producing a silyl polymer including the step(s) of:

(I) reacting, in a first step:
- (Ia) at least one polyol compound; and
- (Ib) at least one iso-silane compound; wherein the first reacting step (I) is carried out at a first predetermined temperature and for a first predetermined period of time at said first temperature to form a PSP; and (II) reacting, in a second step:
- (IIa) the PSP resulting from step (I); and
- (IIb) at least one amino silane compound; wherein the second reacting step (II) is carried out at a second predetermined temperature and for a second predetermined period of time at said second temperature to form a FSP.

In even other embodiments, the present invention includes processes of making the above adhesive composition; and the above laminate.

DETAILED DESCRIPTION

"Retort conditions" herein means sterilization of food after the food is sealed in a container by steam or other heating methods. Typically, the sterilization temperatures vary from 230° F. (110° C.) to 275° F. (135° C.).

"Iso-silane" here means a compound having an isocyanate functional group and a silane functional group.

"Silyl polymer" herein means a silane-modified compound or polymer having at least one silane group.

"Partial silyl polymer" herein means a polymer formed by the reaction of (Ia) at least one polyol compound; and (Ib) at least one iso-silane compound.

"Final silyl polymer" herein means a polymer formed by the reaction of (IIa) the partial silyl polymer described above; and (IIb) at least one amino silane compound.

As used throughout this specification, the abbreviations given below have the following meanings, unless the context clearly indicates otherwise: "=" means "is equal to"; @ means "at"; "<" means "less than"; ">" means "greater than"; "e.g." means "for example"; g=gram(s); g/m$^2$ or "gsm"=gram(s) per square meter(s); g/m$^3$=gram(s) per cubic meter(s); mg=milligram(s); kg=kilograms; Da=Dalton(s); L=liter(s); mL=milliliter(s); g/L=grams per liter; m=meter(s); μm=microns; mm=millimeter(s); cm=centimeter(s); min=minute(s); s=second(s); hr=hour(s); m/min=meters per minute(s); kW=kilowatts; mm/min=millimeter(s) per minute; ° C.=degree(s) Celsius; mPa·s=millipascals-seconds; PSI=pounds per square inch; MPa=millipascals; mm$^2$=millimeter squared; %=percent; eq %=equivalent percent; and wt %=weight percent.

Unless stated otherwise, all percentages, parts, ratios, and like amounts, are defined by weight. For example, all percentages stated herein are weight percentages (wt %), unless otherwise indicated.

Temperatures are in degrees Celsius (° C.), and "ambient temperature" or "room temperature" means between 20° C. and 25° C., unless specified otherwise.

In the art of adhesives, to make a two-part (a two-component) adhesive system or adhesive composition includes providing a first part comprising an isocyanate component (herein "Component A"); providing a second part comprising an isocyanate-reactive component (herein "Component B"); and then combining or mixing Component A and Component B to form the two-part reaction mixture adhesive system or adhesive composition.

In one broad embodiment, the present invention is directed to a solvent-based polyurethane retort adhesive composition for producing a laminate including an isocyanate component, Component A, and an isocyanate-reactive component, Component B, as described above. However, in the present invention, a novel Component B is used comprising a combination of: (Bi) at least one silyl polymer, and (Bii) at least one polyol compound.

Partial Silyl Polymer

In one embodiment, the partial silyl polymer (PSP) of the present invention is produced by reacting a polyol compound and an iso-silane compound. The polyol compound reacts with the iso-silane compound through a reaction of the hydroxyl groups present on the polyol compound with the isocyanate functional groups of the iso-silane compound to form a reaction product comprising a formulation or composition mixture of compounds. A composition mixture is formed because during the above polyol/iso-silane reaction, some, but not all, of the polyol functional groups of the polyol compound react with the isocyanate functional groups of the iso-silane compound. Therefore, the reaction product resulting from the above polyol/iso-silane reaction, i.e. the PSP, is a formulation or composition mixture including at least one silyl polymer (i.e., a compound that contains at least one silane-functional group); and residual unreacted polyol compound and/or residual unreacted iso-silane compound. The OH number of PSP is generally from 1 to 100 in one embodiment, from 2 to 50 in another embodiment, and from 2 to 30 in still another embodiment.

The polyol compound useful in preparing the PSP of the present invention can include, for example a single compound; or a combination, blend or mixture of two or more compounds. For example, the polyol compound is at least one compound selected from the group consisting of a polyether polyol, a polyester polyol, a polyurethane polyester polyol, a polycarbonate polyol, a polyacrylate polyols, a polycaprolactone polyol, a natural oil polyol, and mixtures thereof.

The iso-silane compound useful in preparing the PSP of the present invention can include, for example, isocyanato-ethoxy-silane, isocyanato-methoxy-silane, and mixtures thereof. In one preferred embodiment, the iso-silane compound useful in the present invention is, for example, isocyanato-ethoxy-silane. In other embodiments, the iso-silane compound can be used in combination with optional additives as desired.

In another preferred embodiment, the iso-silane compound can include one or more commercially available compounds including, for example, SILQUEST™ A-LINK-25 (gamma-isocyanatopropyltri-ethoxysilane), SILQUEST™ A-LINK-35 (gamma-isocyanatopropyltrimethoxysilane), and mixtures thereof SILQUEST™ A-LINK-25 having a molecular weight of 247.3 and SILQUEST™ A-LINK-35 having a molecular weight of 205.2 are both available from Momentive Inc.

In general, the process of forming the PSP of the present invention includes, for example, reacting: (α) at least one polyol compound; and (b) at least one iso-silane compound. The concentration of the iso-silane compound is from 0.1 wt % to 10 wt % in one embodiment, 0.1 wt % to 5 wt % in another embodiment, 0.1 wt % to 3 wt % in still another embodiment based on the total components in the reaction mixture. Other optional materials, additives or agents can be added to the above components (α) and/or (b).

Final Silyl Polymer

In one embodiment, the FSP includes a reaction product of: (i) the above-described PSP; and (ii) at least one amino silane compound. The PSP, component (i), has been described above. The at least one amino silane compound (i.e., a compound that contains both silane groups and NH groups), component (ii), can include, for example, SILQUEST™ A1100, an amino silane compound available from Momentive Company. The amount of the amino silane compound used in the above reaction mixture, can be in the range of from 0.1 wt % to 5 wt % in one general embodiment; from 0.1 wt % to 3 wt % in another embodiment, and from 0.2 wt % to 2 wt % in still another embodiment, based on the total weight of the components in the reaction mixture.

The FSP of the present invention, i.e. the reaction product resulting from the above PSP/amino silane reaction, is a formulation or composition mixture including at least one silyl polymer (i.e., a compound that contains at least one a silane-functional group); and residual unreacted polyol compound and/or residual unreacted amino silane compound. The OH number of PSP is generally from 1 to 100 in one embodiment, from 2 to 50 in another embodiment, and from 2 to 30 in still another embodiment.

In one broad embodiment, the process for making the FSP of the present invention includes firstly preparing a PSP, which, as described above, is a pre-formed polymer or prepolymer having at least one end of the polymer terminated with a hydroxyl group; and then secondly reacting the PSP with an amino silane compound; wherein the first and second reactions are carried out at separate temperatures and separate periods of time. In another embodiment, the process of forming the FSP of the present invention, in general, includes, for example, reacting: (i) the above-described PSP, and optionally one or more other different polyol compounds in combination with the PSP; and (ii) at least one amino silane compound to form the FSP. In a preferred embodiment, the amino silane compound is blended into the PSP as an additional reactive additive.

For example, in another preferred embodiment, the process for making the FSP includes the following two-step process of:

Step (I): reacting, in a first step:

(Ia) at least one polyol compound (e.g., a hydroxyl compound such as a polyether polyol, a polyester polyol or a blend thereof); and (Ib) at least one iso-silane compound; wherein the first reacting step (I) is carried out at a first predetermined temperature and for a first predetermined period of time at said first temperature to form a PSP; and Step (II) reacting, in a second step:

(IIa) the PSP resulting from step (I) and optionally other different polyol compounds; and (IIb) at least one amino silane compound; wherein the second reaction is carried out at a second predetermined temperature and for a second predetermined period of time at said second temperature to form the FSP which includes at least one compound that represents a final hydroxyl compound in Component B of the adhesive composition of the present invention.

The first step (I) of the above process of the present invention, includes a first predetermined temperature of from 50° C. to 100° C. in one general embodiment; from 50° C. to 80° C. in another embodiment; and from 50° C. to 70° C. The heating time, i.e., the first predetermined period of time in the first step of the above process of the present invention is from 2 hr to 10 hr in one general embodiment; and from 4 hr to 6 hr in another embodiment.

The second step (II) of the above process of the present invention, includes a second predetermined temperature of from 50° C. to 100° C. in one general embodiment; and from 60° C. to 70° C. in another embodiment. The heating time, i.e., the second predetermined period of time in the second step of the above process of the present invention is from 1 hr to 10 hr in one general embodiment; and from 2 hr to 6 hr in another embodiment.

The resulting FSP of the present invention prepared by the two-step process described above, in a general embodiment, has a controlled total solids content amount of from 30% to 100% by weight, from 40% to 80% in another embodiment, and from 50% to 70% in still another embodiment, based on the resin composition in the reactor with the remaining compound being at least one solvent.

The resulting FSP of the present invention, in a general embodiment has a controlled viscosity @ 25° C. of from 1,000 mPa·s to 30,000 mPa·s, from 2,000 mPa·s to 10,000 mPa·s in another embodiment, and from 2,000 mPa·s to 6,000 mPa·s in still another embodiment.

The use of an amino silane compound in forming the FSP is beneficial because the amino silane compound can complex with reactive sites of metal films, metal oxide coated films, or polymer films to improve adhesion.

As aforementioned, the process of preparing the FSP includes mixing and reacting (i) the PSP and optionally in combination with another different polyol compound, and (ii) the amino silane compound. In one embodiment, components (i) and (ii) are brought into contact with each other and mixed together to form the FSP. The optional polyol compound in combination with the PSP, component (i), can be a polyether polyol, polyester polyol, a polyurethane polyester polyol, a polycarbonate polyol, a polyacrylate polyols, a polycaprolactone polyol, a natural oil polyol, and mixtures thereof.

After the reaction the polyol compound with the iso-silane compound in the first reaction; and the reaction of the PSP with the amino silane compound in the second reaction, the desired OH number of the resulting FSP reaction product (used as Component B in the adhesive composition) is from 1 to 100 in one embodiment; from 1 to 50 in another embodiment; from 1 to 30 in still another embodiment; and from 1 to 20 in yet another embodiment.

In general, the FSP has a molecular weight of from 200 Da to 50,000 Da in one embodiment, and from 10,000 Da to 30,000 Da in another embodiment. Using an FSP with a higher molecular weight (e.g., >50,000 Da), the FSP cold becomes too high in viscosity and not workable; and using an FSP having a lower molecular weight (e.g., <200 Da) the final cured adhesive does not have the final performance desired or required by EU regulations.

Advantageously, using an iso-silane compound in a first reaction and an amino silane compound in a second reaction, provides a resulting reaction product mixture that contains at least one silyl polymer such as a PSP and/or a FSP. The silyl polymer in combination with a polyol compound can be used as Component B in the adhesive composition; and when used in an adhesive composition generates an adhesive composition having the same or similar performance of an adhesive composition prepared using an epoxy-silane promoter previously used for retort applications. The iso-silane compound is not commonly used as an adhesion promoter for flexible food packaging because iso-silane compound is not food-contact approved. However, the synthesis procedure of the PSP and FSP used in the present invention links the adhesion promoter (the silane group) to the backbone of the polyester resin used. And thus, extraction tests in isooctane demonstrates a level of free iso-silane below the limit of 10 ppb, a limit imposed by EU regulations for molecules that are not listed for food contact. Advantageously, the silane modified adhesion promoter of the present invention complies with the EU regulations and the above required limits.

Adhesive Composition

In one general embodiment, the adhesive formulation or adhesive composition of the present invention includes a two-part polyurethane adhesive composition (2K PU adhesive composition) useful for retort applications. For example, the adhesive composition includes (A) at least one isocyanate component as a first part or Component A; and (B) at least one isocyanate-reactive component as a second part or Component B. The at least one an isocyanate-reactive, Component B, includes (Bi) a silyl polymer such as the above PSP and/or the above FSP, and (Bii) at least one polyol compound.

The isocyanate component (an NCO-component), Component A, of the present invention includes, for example, any of the conventional isocyanate compounds known in the art of forming a polyurethane adhesive composition including, for example, aromatic isocyanate compounds; aliphatic isocyanate compounds; blends of aromatic isocyanate compounds and aliphatic isocyanate compounds; pre-polymer isocyanate derivates; and mixtures thereof.

The isocyanate-reactive component, Component B, of the present invention includes, for example, a mixture or blend of (Bi) the PSP and/or the FSP described above in combination with (Bii) at least one polyol compound (i.e., a hydroxyl group-containing compound); wherein the polyol compound, component (Bii), can include one or more different conventional polyol compounds.

In a preferred embodiment, the present invention includes a solvent-based 2K PU adhesive composition including the isocyanate component (e.g., an aromatic and/or an aliphatic compound) as Component A; and the isocyanate-reactive component as Component B, such as a mixture of the PSP described above, the FSP described above, and a polyol compound, wherein Component B has at least one compound that has a reactive group, such as a hydroxyl-terminated polyol group (OH-group), that reacts with the isocyanate of Component A. The solvent used in the above adhesive composition can be, for example, ethyl acetate, methyl ethyl ketone, methyl acetate, cyclohexane, propyl acetate, or other appropriate solvent; or a solvent mixture.

In a preferred embodiment, the polyol compound, component (Bii), used in Component B can include one or more commercially available compounds including, for example, ADCOTE™ 810A EA, a polyol compound available from The Dow Chemical Company.

The amount of the isocyanate-reactive component, Component B, in the adhesive composition can be generally in the range of from 5 wt % to 99.5 wt % in one embodiment; from 30 wt % to 98 wt % in another embodiment; and from 50 wt % to 97 wt % in still another embodiment based on the total weight of the components in the adhesive composition.

Although the present invention is directed to a two-part system, the adhesive composition of the present invention may be formulated with a wide variety of optional additives to enable performance of specific functions of the optional additives while maintaining the excellent benefits/properties of the adhesive composition. The optional components, compounds, agents or additives that can be added to the 2K PU adhesive composition may be added to the Component A, the Component B, or a blend of Component A and B. For example, in one embodiment, the optional additives useful in the adhesive composition may include additional adhesion promoters; gas- and water-scavengers; compatibilizers; chemical rheology modifiers; fillers; polymer resins; chain extenders; catalysts; and the like.

In one broad embodiment, the process for making the laminating adhesive composition of the present invention includes thoroughly mixing, admixing or blending: (A) at least one isocyanate component described above; (B) at least one PSP or at least one FSP and optionally a different polyol compound; and (C) any optional ingredients to form an adhesive composition or adhesive mixture which can be processed via conventional mixing equipment and techniques used for making mixtures. The component (A), (B) and (C) have to be mixed at a preferred specific mixing ratio of hydroxyl group/isocyanate groups to obtain an adhesive composition with the proper solids content and to provide a cured adhesive with the desired performance. Such mixing ratio of hydroxyl group/isocyanate groups is from 100/2 to 100/15 in one embodiment; and from 100/2 to 100/30 in another embodiment. The isocyanate component, Component A, and the isocyanate-reactive component, Component B, are present at a stoichiometric ratio (NCO to OH) of, for example, from 1 to 5 in one general embodiment.

The order of mixing of the components is not critical and two or more components can be mixed together followed by addition of the remaining components. Although the order of mixing of the components is not critical, a sufficient amount of solvent (e.g., ethyl acetate) is added to the mixture to provide the appropriate coating weight, solid content and viscosity. For example, Table A below represent a typical dilution table for preparing the adhesive composition. For example, Table A describes diluting with ethyl acetate at a mixing ratio of 100/10 hydroxyl/isocyanate components for a specific % of solid content in an application:

TABLE A

| Solids Content (%) | Isocyanate-Reactive Component (OH) (kg) | Isocyanate Component (NCO) (kg) | Ethyl Acetate (kg) | Viscosity (s @ 25° C. DIN cup 4 mm) |
|---|---|---|---|---|
| 40 | 100 | 10 | 60 | 40 |
| 35 | 100 | 10 | 80 | 26 |
| 30 | 100 | 10 | 112 | 17 |
| 25 | 100 | 10 | 155 | 15 |

Once the adhesive composition is made according to the process described above, the resultant adhesive composition can be used to prepare laminates which in turn is used to make a retort pouch. Some of the advantageous properties exhibited by the resulting adhesive composition produced according to the above-described process, can include, for example, the adhesive composition has a strong bond adhesion performance to films and aluminum foil. For example, in one embodiment, based on the isocyanate component used, the adhesion performance property of the adhesive composition can be from 4 N/15 mm to 10 N/15 mm after subjecting the pouch to a retort process. The adhesion performance property of the adhesive composition can be measured using the procedure described in ASTM F904

In a preferred embodiment, the present invention includes a 2K PU adhesive composition, where the 2K PU adhesive composition includes, for example: (A) an aromatic or aliphatic isocyanate compound (a compound having an NCO group) as Component A; and (B) an isocyanate-reactive component having a reactive group as Component B, such as a hydroxyl-terminated polyol group (OH-group), that reacts with the isocyanate. The adhesive composition of the present invention used to make a laminate, such as a metal/polymer film laminate, is capable of maintaining performance characteristics which permits the film laminate to withstand retort processing conditions (e.g., 121° C. for 1 hr or 2 hr; 132° C. for 30 min or 45 min; and/or 135° C. for 30 min to 45 min) with minimal decrease of bond strength performance (e.g., the laminate maintains a bonding strength of from 4 N/15 mm or greater measured at 134° C. for 1 hr).

In a broad embodiment, the laminate product of the present invention includes the combination of at least two film or substrate layers adhered together by an adhesive layer formed from the adhesive composition of the present invention. For example, the laminate product includes: (α) a first film or substrate layer; (β) a second film or substrate layer; and (γ) a layer of the adhesive composition described above for binding the layers (α) and (β). One or more other optional film or substrate layers can be used to produce a multi-layer laminate structure, if desired.

The first or primary layer (α), of the present invention can include one or more layers of for example, plastic films; metalized films; metal substrates; and combinations thereof. In one embodiment, the first layer (primary film) can include, for example, a polyester (PET) film, an oriented polyamide (OPA) film, or combinations thereof. In other embodiments, the primary film useful in the present invention can include, for example, PET SIOX, PET AlOX, and combinations thereof. In a preferred embodiment, the first layer (primary film) can include, for example, at least one PET film or a film that is a similar modified version of PET which is chemically or coated treated.

The thickness of the first layer used to form the multi-layer laminate product of the present invention can be, for example, from 10 μm to 50 μm in one embodiment and from 10 μm to 30 μm in another embodiment.

The second or secondary layer (β), of the present invention can include one or more layers of, for example, aluminum foil, cast polypropylene (CPP), polyethylene (PE), and combinations thereof. In one preferred embodiment, the second layer (secondary layer) can include, for example, aluminum foil.

The thickness of the second layer used to form the multi-layer laminate product of the present invention can be, for example, from 5 μm to 150 μm in one embodiment; from 5 μm to 100 μm in another embodiment; from 5 μm to 20 μm in still another embodiment; from 5 μm to 15 μm in yet another embodiment; and from 5 μm to 9 μm in even still another embodiment.

The layer of adhesive composition (γ), used to bind the first layer (α) and the second layer (β), respectively, is described above. The thickness of the adhesive layer used to bind the first and second layers together to form the multi-layer laminate product of the present invention can be, for example, from 1 μm to 10 μm in one general embodiment; or in terms of coating weight, between 2 $g/m^2$ to 10 $g/m^2$.

The laminate product of the present invention is produced by applying the adhesive composition described above onto the surface of a first film or substrate to form an adhesive layer on the surface of the film or substrate. The application of the adhesive composition can be carried out by common application systems such as reverse gravure, direct gravure; smooth roller system, and other conventional methods. For example, the adhesive composition can be applied using conventional equipment and processes, such as using a solvent-based laminator.

In a general embodiment, the process for producing the laminate product of the present invention includes, for example, the steps of:

(A') providing: (α) at least one first layer of a film or a substrate; (β) at least a second layer of a film or a substrate; and (γ) the adhesive composition as described above;

(B') applying the adhesive composition (γ) of step (A'), to at least a portion of the surface of one side of: (1) the first layer of a film or a substrate, (2) the second layer of a film or a substrate, or (3) the first layer of a film or a substrate and the second layer of a film or a substrate to form an adhesive layer;

(C') combining the first and second films or substrates together with the adhesive layer sandwiched between the first and second layers, sufficient to form a multi-layer laminate structure; and (D') curing the multi-layer laminate structure to bind the first and second layers to form a multi-layer laminate product.

In one embodiment, the maximum chemical and thermal properties of the cured laminate structure develop, for example, at ambient temperature, within a curing period of from 2 days to 14 days; and from 2 days to 10 days in another embodiment;

In another embodiment, the curing process could be increased using a hot room fixed at, for example, at a temperature of from 30° C. to 60° C. in one embodiment; and from 30° C. to 50° C. in another embodiment. The curing time at the above curing temperatures can be for a period of time of from 1 days to 14 days in one embodiment; and from 2 days to 10 days in another embodiment.

In one preferred embodiment, the process conditions used to make a laminate product can include, for example, the conditions described in Table B.

TABLE B

| Parameter | |
|---|---|
| Nip temperature, ° C. | 50 |
| Machine speed, m/min | 50 |
| Drying Temperature- Oven 1, ° C. | 75 |
| Drying Temperature- Oven 2, ° C. | 85 |
| Drying Temperature- Oven 3, ° C. | 95 |
| Solid Content, % | 30 |
| Gravure Cylinder number | 40 |
| Coating weight - requested, $g/m^2$ | 4.5 |
| Coating weight - applied, $g/m^3$ | 4.2 |
| Corona treatment Carrier Web: YES/NO, kW | NO |
| Corona treatment Secondary Web: YES/NO, kW | NO |
| Roll length, m | 60 |
| Curing Conditions | |
| Curing Temperature, ° C. | 45 |
| Curing Time, day | 7 |
| Relative Humidity, % | 50 |

The adhesive composition of the present invention is useful, for example, for producing a laminate product for retort applications as described above. Some of the advantageous properties exhibited by the resulting laminate product produced according to the above described process, can include, for example, laminate products offering great performance solutions to a number of challenging structural packaging applications. These include ready-to-eat meal and freezer-to-microwave requirements for food, as well as the stringent requirements involved in pharmaceutical applications. In addition, the adhesive composition of the present invention offers, for example, excellent adhesion to clear barrier retortable films, enhanced product resistance, increased thermal resistance, increased chemical resistance, and extended product lifecycle reliability. The adhesive composition of the present invention is in compliance with most US FDA and European regulations related to food contactable materials.

EXAMPLES

The following examples are presented to further illustrate the present invention in detail but are not to be construed as limiting the scope of the claims. Unless otherwise stated all parts and percentages are by weight.

Various terms and designations used in the Inventive Examples (Inv. Ex.) and the Comparative Examples (Comp. Ex.) which follow are explained herein below:

"PRELAM" stands for prelaminated.

"CPP" stands for cast polypropylene.

"PET" stands for polyethylene terephthalate.

"ALU" stands for aluminum and more specifically for aluminum foil.

"Foil" means an aluminum foil.

"AKG™" is CPP and a trademark of Bipack (Company)

"CO-REACTANT F™" means a co-reagent which is a trademark of The Dow Chemical Company.

"CAT F" stands for CATALYST F™

"AMI" stands for amino silane.

"ISO" stands for isocyanate.

"ISO-PET" stands for isocyanate-polyester resin.

Various raw materials used in the Inv. Ex. and the Comp. Ex. are described as follows:

The isocyanate compounds used in the Examples are as follows:

(1) "Isocyanate 1" is an aliphatic isocyanate compound (e.g., MOR-FREE™ 200C).

(2) "Isocyanate 2" is an aliphatic isocyanate compound (e.g., CATALYST 9L10™ [9L10]).

(3) "Isocyanate 3" is an aliphatic isocyanate compound (e.g., ADCOTE™ 811B).

(4) "Isocyanate 4" is an aromatic isocyanate compound (e.g., CATALYST F™)

The polymer resins used in the Examples are as follows:

(1) "Polymer Resin 1" is a standard polyester polyol resin (e.g., ADCOTE™ 811A EA).

(2) "Polymer Resin 2" is a polyester polyol resin (e.g., ADCOTE™ L810).

The adhesion promoters used in the Examples are as follows:

(1) "Additive 1" is 3-isocyanatopropyltriethoxysilane.

(2) "Additive 2" is N-(2-aminoethyl)-3-aminopropyltriethoxysilane.

(3) "Additive 3" is 3-aminopropyltriethoxysilane.

General Procedure for Preparing Silane Functionalized Polyester Polyols

General Process Step (1)—Forming the PSP

The above-described adhesion promoters were used to functionalize the backbone of the above-described polyester polymer resins. For example, a solvent-based polyester polyol resin, for example, 5,925.4 g of a polyester polyol resin, such as ADCOTE™ L810 (98.756% w/w) or Polymer Resin 2 in a solvent such as ethyl acetate was charged into a round flask (e.g., a 6.5 L glass reactor) equipped with an overhead stirrer and a thermometer under ambient conditions. The solution in the glass reactor was heated to about 60° C. under stirring in an oil bath, and gradually heated to 70° C. with flowing nitrogen and overhead stirring. The solvent was refluxed back to the reactor via a condenser maintained at temperatures <0° C. After the temperature of Polymer Resin 2 was stabilized at 70° C. for 30 min to 45 min, a certain predetermined amount of an adhesion promoter was quickly charged into the glass reactor, for example 44.8 g of an iso-silane compound, SILQUEST™ A Link 25 (0.746% w/w) or Additive 1.

A gradual increase of temperature due to the exothermic reaction of SILQUEST™ A Link 25 with ADCOTE™ L810 was observed. After such gradual increase of temperature, the temperature of the glass reactor was increased to 70° C. with an oil-bath; and the resulting reaction mixture was kept at 70° C. The resultant mixture was allowed to react for various lengths of time, for example the different reaction time intervals used included 2 hr, 4 hr, 6 hr, and 8 hr. For example, the resulting reaction mixture was kept at 70° C. for 6 hr. After 6 hr at 70° C., the presence of any residual isocyanate groups (NCO) of SILQUEST™ A Link 25 (iso-silane) in the reaction solution was controlled by infrared spectra analysis. Once an NCO peak present in the reaction solution was zero as measured by infrared spectra analysis, the resulting product from the reaction solution of this step (1) was cooled from 70° C. to a temperature of 60° C.

The reaction exotherm of the reaction mixture was controlled via monitoring the reactor temperature ensuring that the reactor temperature was maintained such that a less than 3° C. temperature increase was observed. The loading levels and reaction time of Additives 1-3 to prepare a silane functionalized polyester polyol composition (e.g., ISO-PET-1 to ISO-PET-6 and AMI) are described in Table I. When the desired reaction time was reached, the resulting product, a PSP, was cooled to room temperature, poured out from the reactor, packaged, and stored for later use.

General Process Step (2)—Forming the FSP

Upon cooling the previously formed product (e.g., the PSP) described above in step (1) to 60° C., an amino silane compound was quickly added to the glass reactor to mix with the previously formed product described above in step (1) to form a reaction mixture. For example, a charge of 29.9 g of SILQUEST™ A1100 (0.498% w/w) was added to the glass reactor. The resultant mixture was allowed to react for various lengths of time, for example, for 2 hr, 4 hr, 6 hr, and 8 hr time intervals. For example, the resulting reaction mixture was kept at 60° C. for 2 hr under stirring. After 2 hr of reaction, the resulting product was cooled to about 30° C.; and then the resulting product was discharged from the glass reactor. The resulting product, a FSP, prepared as described above had a controlled total solids content amount of from 58 wt % to 62 wt %; and a controlled viscosity @ 25° C. of from 6,000 to 7,000.

When an amino silane compound (e.g., Additive 2 and AMI) were used, no chemical reaction occurred by formulating these compounds as described above in Step (1). The solvent-based polyester polyol was charged into a round flask under ambient conditions and gradually heated to 60° C. with flowing nitrogen and overhead mixing. Then, a certain predetermined amount of Additive 2 was quickly charged into the 60° C. reactor and blended for 2 hr. After blending and heating for 2 hr, the resultant product was cooled to room temperature, poured out, packaged, and stored for later use. The loading levels and blending time of Additive 2 are described in Table I.

The above same procedures were used for the preparation of the ISO-PET 6 with the combination of Additive 1 (6 hr @ 70° C.) plus the Additive 3 (2 hr @ 60° C.) (see Table I).

TABLE I

| Silane Functionalized Polyester Polyol Compositions | | | | | | | |
|---|---|---|---|---|---|---|---|
| | Silane Functionalized Polyester Polyol Composition Designation | | | | | | |
| Ingredient Charges | ISO-PET-1 (wt %) | ISO-PET-2 (wt %) | ISO-PET-3 (wt %) | ISO-PET-4 (wt %) | ISO-PET-5 (wt %) | AMI (wt %) | ISO-PET-6 (wt %) |
| ADCOTE ™ L810 (no promoter) | 99.45 | 99.31 | 99.17 | 99.25 | 99.25 | 99.41 | 98.75 |
| Additive 1 | 0.55 | 0.69 | 0.83 | 0.75 | 0.75 | — | 0.75 |
| Additive 2 | — | — | — | — | — | 0.59 | |
| Additive 3 | | | | | | | 0.5 |
| Reaction time at 70° C. (hr) | 2 | 2 | 2 | 4 | 8 | — | 6 |
| Blending time at 60° C. (hr) | — | — | — | — | — | 2 | 2 |

General Procedure for Preparing an Adhesive Composition

Each of the various polyester polyol resins, i.e., the silane functionalized polyester polyol compositions (or silane-modified hydroxyl-terminated polymers or silyl polymers) described in Table I above, were mixed with an isocyanate compound (e.g., MOR-FREE™ 200C or 9L10) to form adhesive compositions, for example as described in Tables II, III and IV.

Examples 1-7—Preparation of Adhesive

The various polyols (e.g., ISO-PET-1 to ISO-PET-5 and AMI) described in Table II were mixed with the isocyanate compound (e.g., MOR-FREE™ 200C or Isocyanate 1) at the ratios specified in the Examples (See Table II) to form the adhesive compositions of Inv. Ex. 1 to Inv. Ex. 7. The adhesive compositions cured with MOR-FREE™ 200C are described in Table II.

TABLE II

| Adhesive Compositions Cured with MOR-FREE ™ | | | | | | | |
|---|---|---|---|---|---|---|---|
| Component | Inv. Ex. 1 (g) | Inv. Ex. 2 (g) | Inv. Ex. 3 (g) | Inv. Ex. 4 (g) | Inv. Ex. 5 (g) | Inv. Ex. 6 (g) | Inv. Ex. 7 (g) |
| ISO-PET-1 | 10.08 | — | — | — | — | — | — |
| ISO-PET-2 | — | 10.00 | — | — | — | — | — |
| ISO-PET-3 | — | — | 10.03 | — | — | — | — |
| ISO-PET-4 | — | — | — | 10.00 | — | — | 9.95 |
| ISO-PET-5 | — | — | — | — | 10.21 | — | — |
| AMI | — | — | — | — | — | 10.05 | — |
| Additive 2 | — | — | — | — | — | — | 0.06 |
| MOR-FREE ™ 200C | 0.46 | 0.45 | 0.47 | 0.38 | 0.39 | 0.59 | 0.58 |
| Ethyl acetate | 10 | 10.30 | 10.81 | 10.11 | 10.65 | 10.12 | 10.30 |
| Mixing ratio | 100:4.6 | 100:4.5 | 100:4.7 | 100:3.8 | 100:3.8 | 100:5.9 | 100:5.8 |
| Solids content | 32.2% | 31.6% | 30.9% | 31.6% | 31.1% | 32.4% | 32.1% |

TABLE III

| Adhesive Compositions Cured with 9L10 | | | | | |
|---|---|---|---|---|---|
| Component | Inv. Ex. 8 (wt %) | Inv. Ex. 9 (wt %) | Inv. Ex. 10 (wt %) | Inv. Ex. 11 (wt %) | Inv. Ex. 12 (wt %) |
| ISO-PET-2 | 10 | — | — | — | — |
| ISO-PET-3 | — | 10.31 | — | — | — |
| ISO-PET-4 | — | — | — | — | 10.06 |
| ISO-PET-5 | — | — | 10.10 | — | — |
| AMI | — | — | — | 10.12 | — |
| Additive 2 | — | — | — | — | 0.06 |
| 9L10 | 0.83 | 0.81 | 0.66 | 1.11 | 1.12 |
| Ethyl acetate | 9.85 | 10.12 | 9.84 | 10.35 | 10.44 |
| Mixing ratio | 100:8.3 | 100:7.9 | 100:6.5 | 100:11 | 100:11.1 |
| Solids content | 32.5% | 32.5% | 32.3% | 32.5% | 32.5% |

Examples 8-12—Preparation of Adhesive

The various polyols (e.g., ISO-PET-2 to ISO-PET-5 and AMI) described in Table III were mixed with the isocyanate compound (e.g., 9L10 or Isocyanate 2) at the ratios specified in the Examples (See Table III) to form the adhesive compositions of Inv. Ex. 8 to Inv. Ex.12. The adhesive compositions cured with 9L10 are described in Table III.

Comparative Examples A-C—Preparation of Adhesive

For comparative purposes, various adhesive compositions were prepared as described in Table IV at the ratios specified in the Examples (See Table IV) to form the adhesive compositions of Comp. Ex. A-C. The comparative adhesive compositions cured with MOR-FREE™ 200C or 9L10 are described in Table IV.

TABLE IV

| Comparative Adhesive Compositions | | | |
|---|---|---|---|
| Component | Comp. Ex. A (wt %) | Comp. Ex. B (wt %) | Comp. Ex. C (wt %) |
| ADCOTE ™ 811A EA | 22.25 | 12.49 | — |
| ADCOTE ™ L810 | — | — | 10.00 |
| MOR-FREE ™ 200C | 0.98 | — | 0.45 |
| 9L10 | — | 1.01 | — |
| Ethyl acetate | 23.01 | 13.11 | 10.03 |
| Mixing ratio | 100:4.4 | 100:8.1 | 100:4.5 |
| Solids content | 31.5% | 31.5% | 32.6% |

Examples 13-16—Preparation of Adhesive

A polyol (e.g., ISO-PET-6) described in Table V was mixed with an isocyanate compound (e.g., MOR-FREE™ 200C and/or 9L10) at the ratios specified in the Examples (See Table V) to form the adhesive compositions of Inv. Ex. 13 to Inv. Ex.16. A Labo Combi machine was used in the Examples. The adhesive compositions are described in Table V.

TABLE V

| Adhesive Compositions | | | | |
|---|---|---|---|---|
| Component | Inv. Ex. 13 (g) | Inv. Ex. 14 (g) | Inv. Ex. 15 (g) | Inv. Ex. 16 (g) |
| ISO-PET-6 [OH terminated] | 100 | 100 | 100 | 100 |
| MOR-FREE ™ 200C [iso terminated] | 4 | | | |
| ADCOTE ™ 811B [iso terminated] | | 11 | | |
| CAT F | | | 10 | |
| 9L10 [iso terminated] | | | | 8 |
| Ethyl acetate | 109 | 116 | 115 | 112 |
| Mixing ratio | 100/4 | 100/11 | 100/10 | 100/8 |
| Solids content in application | 30% | 30% | 30% | 30% |

Comparative Examples D-G—Preparation of Adhesive

A polyol (e.g., ADCOTE™ 811A EA or Polymer Resin 1) described in Table VI was mixed with an isocyanate compound (e.g., MOR-FREE™ 200C and/or 9L10) at the ratios specified in the Examples (See Table VI) to form the adhesive compositions of Comp. Ex. D to Comp. Ex. G. A Labo Combi machine was used in the Examples. The adhesive compositions are described in Table VI.

TABLE VI

| Comparative Adhesive Compositions | | | | |
|---|---|---|---|---|
| Component | Comp. Ex. D (g) | Comp. Ex. E (g) | Comp. Ex. F (g) | Comp. Ex. G (g) |
| ADCOTE ™ 811A EA | 100 | 100 | 100 | 100 |
| CAT F | 10 | | | |
| MOR-FREE ™ 200C | | 4.5 | | |
| 9L10 | | | 8 | |
| 811B | | | | 10 |
| Ethyl acetate | 115 | 110 | 112 | 15 |
| Mixing ratio | 100/10 | 100/4.5 | 100/8 | 100/10 |
| Solids content | 30 | 30 | 30 | 30 |

General Procedure for Preparing a Film

Using a hand lamination procedure, each of the adhesive composition mixtures were applied to a primary film (back foil), using a Meyer rod #3 which gave a consistent adhesive composition coating weight in the range of from 2.0 pounds/ream (3.26 g/m$^2$) to 2.3 pounds/ream (3.26 g/m$^2$). Then, the adhesive composition coating was allowed to dry for 1 min in a 90° C. convective oven.

General Procedure for Preparing a Laminate

After the adhesive composition coating dried as described above, the coating was laminated with a secondary film (CPP) using a hand laminator with a nipping roll temperature of 65° C. and a nipping pressure of 20 PSI (0.14 MPa). For all adhesive compositions, the solids content was maintained at 30% to 32% by weight during casting. Bond strength between the two films was measured at various temporal intervals (e.g. after 1 day, 3 days, and 7 days from lamination and storing in a hot room at 45° C. for 7 days) after the lamination using the 90° T-peel test described below.

The laminates made in the Examples using the procedure above were multi-layer laminates made according to the machine parameters set forth below in Table VII.

TABLE VII

| Lamination Process on a Labo Combi Machine | |
|---|---|
| Parameter | |
| Nip temperature, ° C. | 50 |
| Machine speed, m/min | 50 |
| Drying temperature- Oven 1, ° C. | 75 |
| Drying temperature- Oven 2, ° C. | 85 |
| Drying temperature- Oven 3, ° C. | 95 |
| Solid content, % | 30 |
| Gravure Cylinder number | 40 |
| Coating weight - requested, g/m$^2$ | 4.5 |
| Coating weight - applied, g/m$^3$ | 4.2 |
| Corona treatment Carrier Web: YES/NO, kW | NO |
| Corona treatment Secondary Web: YES/NO, kW | NO |
| Roll length, m | 60 |
| Curing Conditions | |
| Curing temperature, ° C. | 45 |
| Curing time, day | 7 |
| Relative humidity, % | 50 |

The laminates of Ex 17 to Ex 32 and Comp. Ex. H to N which follow: include a layer of a polyol compound, ISO-PET 6, mixed with an isocyanate compound (e.g., MOR-FREE™ 200C, 9L10, ADCOTE™ 811B [Isocyanate 3] and CAT F [Isocyanate 4]). The laminates obtained were compared to a standard ADCOTE™ 811A EA mixed with the same isocyanate compounds.

The PET/ALU/CPP laminates were prepared using a Labo Combi 400 machine applying between 4 gsm and 4.5 gsm of adhesive composition between each layer. After curing the above laminates, retort tests were performed and the thermal cycles of the retort tests are indicated in the Table X.

Examples 17-32 and Comparative Examples H—N—Preparation of Laminate

In Inv. Ex. 17-32, a PET/ALU/CPP laminate structure was made using a PRELAM structure (available from The Dow Chemical Company). The PRELAM is a multi-layer structure comprising a 12 μm (48 gauge) polyester (PET) film laminated onto a 0.00035 mil aluminum foil with ADCOTE™ 577/CO-REACTANT F™. The lamination is carried out at 3.26 g/m$^2$ (2.0 lbs/ream). In addition to the PRELAM above, a CPP having a thickness of 3 mil was used. An aluminum foil of 1.5 gauge was also used to prepare a laminate structure.

In Comp. Ex. H—N, a PET/ALU/CPP laminate structure was made using a PET layer 12 μm thick which is pre-treated with a corona treatment; an ALU layer 9 μm thick; and a CPP layer wherein the AKG is 65 μm thick.

Using the general procedure described above various laminates were prepared and tested. The test results of the films are described in Tables VIII, IX and X.

General Procedure for Preparing a Pouch

After 7 days of curing the laminates described above at 45° C. and 30% relative humidity, pouches were made using the above-described laminate structures. The laminates were made from the PRELAM/CPP and PET/ALU/CPP as described above. One of the 9 inches×12 inches (23 cm×30.5 cm) sheets of laminate was folded over to give a double layer about 9 inches×6 inches (23 cm×15.3 cm) such that the polymer film of one layer was in contact with the polymer film of the other layer. The edges of the film were trimmed on a paper cutter to give a folded piece size of about 5 inches×7 inches (12.7×17.8 cm). Two long sides of the film and one short side of the film was heat sealed at the edges to give a finished pouch with an interior size of 4 inches×6 inches (10.2 cm×15.2 cm). The heat sealing of the film was done at 420° F. (216° C.) for 1 s at a hydraulic pressure of 40 PSI (276 kPa).

Two or three pouches were made for each test. Pouches were filled through the open edge with 100±5 mL of deionized (DI) water. Splashing the filling onto the heat seal area was avoided as contacting the filling with the heat seal area could cause the heat seal to fail during testing. After filling, the top of the pouch was sealed in a manner that minimized air entrapment inside of the pouch. The seal integrity was inspected on all four sides of the pouches to ensure that there were no flaws in the sealing that would cause the pouch to leak during testing. Any defected pouches were discarded and replaced with non-defected pouches. In some cases, flaws in the laminate were marked to identify whether new additional flaws were generated during testing. After sealing the pouches filled with DI water, the pouches were subjected to retort testing as described below.

Test Procedures

Bond Strength Measurement

A 90° T-peel test was done on laminate samples cut to 15 mm wide strips and pulled on a Thwing Albert™ QC-3A peel tester equipped with a 50 N loading cell at a rate of 0.7 N/mm. When the two films in the laminate separated (peeled), the average of the force during the pull was recorded. If one of the films stretched or broke, the maximum force or force at break was recorded. The values were the average of three separate sample strips. The failure mode (FM) or mode of failure (MOF) was recorded as follows:

"FS" which refers to film stretch.

"FT" which refers to film tears or breaks.

"DL" which refers to delaminated (e.g., the secondary film separates from the primary film).

"AT" which refers to adhesive transfer (e.g., the adhesive fails to adhere to the primary film and is transferred to the secondary film).

"AS" which refers to adhesive split or cohesive failure (e.g., the adhesive is found on both the primary film and the secondary film).

Retort Test Procedure

The pouches containing DI water were placed in a retort chamber programmed for undergoing a retort cycle including: (1) a heating/pressurizing stage, (2) an isothermal stage, and (3) a cooling/depressurizing stage with the isothermal stage set at 121° C. for 1 hr, 128° C. for 1 hr, or 134° C. for 1 hr. The pouches were removed after retort testing; and the extent of any defects, such as tunneling, blistering, delamination, or leakage, were visually compared with any of the marked preexisting flaws. The observations of the defects were recorded according to the failure mode designations above. The pouches were cut open, emptied, and dried under ambient conditions. One or more one-inch (15 mm) strips were cut from the pouches and the laminate bond strength was measured according to the standard bond strength test described earlier. The bond strength test was performed as soon as possible after removing the pouch contents. The interior of the pouches was examined and any other visual defects were recorded.

Bond strength and retort performance data is described in Tables VIII, IX and X. For example, Table VIII describes the bond strength and retort performance results for a Foil/CPP laminate structure cured with MOR-FREE™ 200C. Table IX describes the bond strength and retort performance results for Foil/CPP laminate structure cured with 9L10. And, Table X describes the bond strength and retort performance results of a PET/ALU/CPP laminate structure made with ADCOTE™ 811A EA and ISO-PET in combination with (MOR-FREE™ 200C, 9L10, CAT F and ADCOTE™ 811B—Labo Combi results).

TABLE VIII

| Laminate | Adhesive | Bond Strength (N/15 mm) | | |
|---|---|---|---|---|
| Example No. | Example No. | 1 day | 7 days | After Retort |
| Comp. Ex. H | Comp. Ex. A | 6.45; AT | 6.67; AT | 7.47; AT |
| Comp. Ex. J | Comp. Ex. C | NM* | 6.16; AT | 5.60; AT |
| Inv. Ex. 17 | Inv. Ex. 1 | 6.77; AT | 7.45; AT | 6.84; AT |
| Inv. Ex. 18 | Inv. Ex. 2 | 6.93; AT | 6.87; AT | 7.18; AT |
| Inv. Ex. 19 | Inv. Ex. 3 | 7.49; AT | 7.02; AT | 6.33; AT |
| Inv. Ex. 20 | Inv. Ex. 4 | 6.38; AT | 7.91; AT | 6.53; AT |
| Inv. Ex. 21 | Inv. Ex. 5 | 6.66; AT | 7.49; AT | 7.38; AT |
| Inv. Ex. 22 | Inv. Ex. 6 | 7.07; AT | 6.95; AT | 5.71; AT |
| Inv. Ex. 23 | Inv. Ex. 7 | 6.15; AT | 6.59; AT | 6.94; AT |

*NM stands for "not measurable".

TABLE IX

| Laminate | Adhesive | Bond Strength (N/15 mm) | | |
|---|---|---|---|---|
| Example No. | Example No. | 1 day | 7 days | After Retort |
| Comp. Ex. I | Comp. Ex. B | 5.54; AT | 7.00; AS/AT | 7.34; AT |
| Inv. Ex. 24 | Inv. Ex. 8 | 6.51; AS/AT | 8.39; AT/AS | 6.98; AT |
| Inv. Ex. 25 | Inv. Ex. 9 | 5.77; AS/AT | 8.03; AT/AS | 6.73; AT |
| Inv. Ex. 26 | Inv. Ex. 10 | 6.42; AS/AT | 8.08; AT/AS | 6.38; AT |
| Inv. Ex. 27 | Inv. Ex. 11 | 5.42; AS/AT | 6.47; AT | 6.03; AT |
| Inv. Ex. 28 | Inv. Ex. 12 | 5.39; AS/AT | 5.93; AT | 7.16; AT |

TABLE X

| Laminate Example No. | Adhesive Example No. | Bond strength (N/15 mm) 1 day | 7 days | After 121° C. for 1 hr retort | After 128° C. for 1 hr retort | After 134° C. for 1 hr retort |
|---|---|---|---|---|---|---|
| Comp. Ex. K | Comp. Ex. D | PET/ALU: 6.1 FT; ALU/CPP: 11.2 AT | PET/ALU: 4.7 FT; ALU/CPP: 10.3 AT | PET/ALU: UN; ALU/CPP: 9.1 AT | PET/ALU: UN; ALU/CPP: 6.0 AT | PET/ALU: UN; ALU/CPP: 6.0 AT |
| Comp. Ex. L | Comp. Ex. E | PET/ALU: 4.2 FT; ALU/CPP: 4.5 AT | PET/ALU: 5.1 FT; ALU/CPP: 5.9 AT | PET/ALU: UN; ALU/CPP: 7.5 AT | PET/ALU: UN; ALU/CPP: 6.4 AT | PET/ALU: UN ALU/CPP: 7.5 AT |
| Comp. Ex. M | Comp. Ex. F | PET/ALU: 5.0 FT; ALU/CPP: 4.1 AS | PET/ALU: 4.3 FT; ALU/CPP: 7.6 AT | PET/ALU: UN; ALU/CPP: 7.2 AT | PET/ALU: UN; ALU/CPP: 6.1 AT | PET/ALU: UN ALU/CPP: 5.7 AT |
| Comp. Ex. N | Comp. Ex. G | PET/ALU: 5.1 FT; ALU/CPP: 8.5 AT | PET/ALU: 5.2 FT; ALU/CPP: 5.3 AT | PET/ALU: UN; ALU/CPP: 5.7 AT | PET/ALU: UN; ALU/CPP: 5.9 AT | PET/ALU: UN ALU/CPP: 5.7 AT |
| Inv. Ex. 29 | Inv. Ex. 13 | PET/ALU: 5.5 FT; ALU/CPP: 6.9 AT | PET/ALU: 6.8 FT; ALU/CPP: 8.7 AT | PET/ALU: UN; ALU/CPP: 6.3 AT | PET/ALU: UN; ALU/CPP: 5.9 AT | PET/ALU: UN ALU/CPP: 5.2 AT |
| Inv. Ex. 30 | Inv. Ex. 14 | PET/ALU: 3.7 FT; ALU/CPP: 8.1 AT | PET/ALU: 4.9 FT ALU/CPP: 8.2 AT | PET/ALU: UN ALU/CPP: 5.6 AT | PET/ALU: UN ALU/CPP: 5.3 AT | PET/ALU: UN ALU/CPP: 4.8 AT |
| Inv. Ex. 31 | Inv. Ex. 15 | PET/ALU: 5.0 FT ALU/CPP: 12.1 AT | PET/ALU: 4.1 FT; ALU/CPP: 14.6 FS + FT | PET/ALU: UN ALU/CPP: 6.7 AT | PET/ALU: UN ALU/CPP: 6.8 AT | PET/ALU: UN ALU/CPP: 6.2 AT |
| Inv. Ex. 32 | Inv. Ex. 16 | PET/ALU: 5.0 FT ALU/CPP: 4.6 AS | PET/ALU: 3.7 FT; ALU/CPP: 7.8 AS | PET/ALU: UN ALU/CPP: 5.8 AT | PET/ALU: UN ALU/CPP: 6.1 AT | PET/ALU: UN ALU/CPP: 6.0 AT |

Discussion of Results

The results reported in the above tables demonstrate values of bond strengths measured after thermal cycles of retort, comparable to a standard product based on epoxy-silane.

The laminates based on the adhesive composition of the present invention formed final pouches able to resist, endure and function at retort conditions.

The procedure of preparing the silyl polymer used in this process advantageously provides the use of a non-food approved silane for food applications.

Other Embodiments

In one embodiment, the PSP of the present invention includes at least has one iso-silane compound, component (b), wherein the iso-silane compound includes isocyanato-ethoxy-silane, isocyanato-ethoxy-silane; or mixtures thereof.

In another embodiment, the solvent-based retort adhesive composition of the present invention comprises a mixture of: (A) at least one isocyanate component as Component A, wherein the isocyanate component can be an aromatic isocyanate compound, an aliphatic isocyanate compound, and mixtures thereof; and (B) at least one isocyanate-reactive component as Component B; wherein the at least one isocyanate-reactive component, Component B, includes (Bi) at least one silyl polymer and (Bii) at least one polyol compound. The polyol compound can be an aromatic polyol compound, an aliphatic polyol compound, an aromatic pre-polymer, an aliphatic prepolymer, and mixtures thereof.

In still another embodiment, the laminate of the present invention, includes (α) at least one first layer of a film or a substrate such as a polyester film.

In a preferred embodiment, the laminate of the present invention includes (α) at least one first layer of a film or a substrate that comprises at least two layers including (1) a film, (2) a substrate, or (3) a combination of a film and a substrate; and wherein the layer of the adhesive composition of the present invention is disposed on the surface of at least one of the layers of (1), (2) or (3) for binding layers (1) and (2) together.

In yet another embodiment, the laminate product of the present invention is used to make a retort article. In a preferred embodiment, the retort article can be a pouch.

The process of producing the silyl polymer of the present invention, includes a first and second step(s) as follows: (I): reacting, in a first step: (Ia) at least one polyol compound; and (Ib) at least one iso-silane compound; wherein the first reacting step (I) is carried out at a first predetermined temperature of from 50° C. to 100° C.; and at a first predetermined time period of from 1 hr to 8 hr to form a partial silyl polymer; and (II) reacting, in a second step: (IIa) the partial silyl polymer resulting from step (I); and (IIb) at least one amino silane compound; wherein the second reaction is carried out at a second predetermined temperature of from 50° C. to 70° C.; and at a second predetermined period of time of from 1 hr to 4 hr to form a final silyl polymer.

The above process of the present invention includes a mixing step of mixing Component A with Component B; and the mixing step is carried out at a temperature of from 15° C. to 60° C.

The process of producing a laminate product of the present invention includes for example using at least one first layer of a film or a substrate made of a polyester resin.

In even still another embodiment, the process of producing a laminate product of the present invention includes the steps of: (i) providing: (α) a first layer of a film or a substrate, (b) a second layer of a film or a substrate; and (c) the laminating adhesive composition of the present invention; (ii) applying the adhesive composition from step (i) to at least a portion of the surface of at least one of the first or second layers of step (i) to form an adhesive layer;

(iii) combining the first and second layers together with the adhesive layer, sufficient to form a laminate structure; and (iv) curing the laminate structure of step (iii) to form a multi-layer laminate product.

What is claimed is:

1. A two-component solvent-based retort adhesive composition comprising:

(A) a first component comprising at least one isocyanate component as Component A; and (B) a second component comprising at least one isocyanate-reactive component as Component B, wherein the Component B comprises (Bi) at least one silyl polymer, wherein the silyl polymer is a final silyl polymer comprising the reaction product of (i) a partial silyl polymer; and (ii) at least one amino silane compound to form the final silyl polymer, wherein the partial silyl polymer comprises the reaction product of (a) at least one polyol compound; and (b) at least one iso-silane compound to form the partial silyl polymer and (Bii) at least one polyol compound.

2. The two-component solvent-based retort adhesive composition of claim 1, wherein the at least one isocyanate component, Component A, comprises at least one aliphatic-based isocyanate compound; or wherein the at least one-isocyanate component, Component A, is a blend of (1) at least one aliphatic-based isocyanate compound and (2) at least one aromatic-based isocyanate compound.

3. The two-component solvent-based retort adhesive composition of claim 1, wherein the at least one isocyanate component, Component A, is an isocyanate prepolymer comprising a reaction product of (1) at least one isocyanate compound and (2) at least one polyol compound.

4. The two-component solvent-based retort adhesive composition of claim 1, wherein the at least one polyol compound, component (Bii), is selected from the group consisting of a polyether polyol, a polyester polyol, a polyurethane polyester polyol, a polycarbonate polyol, a polyacrylate polyol, a polycaprolactone polyol, a natural oil polyol, and a blend thereof.

5. The two-component solvent-based retort adhesive composition of claim 1, further comprising a solvent selected from the group consisting of ethyl acetate, methyl ether ketone, toluene, and mixtures of two or more thereof.

6. The two-component solvent-based retort adhesive composition of claim 1, further comprising an additive selected from the group consisting of a catalyst, a surfactant, a leveling agent, a defoamer, a filler, a rheology modifier, a color pigment, and mixtures of two or more thereof.

7. The two-component solvent-based retort adhesive composition of claim 1, wherein the final silyl polymer is produced by a process comprising the step(s) of:

(I): reacting, in a first step:

(Ia) the at least one polyol compound; and (Ib) the at least one iso-silane compound; wherein the first reacting step (I) is carried out at a first predetermined temperature and for a first predetermined period of time at said first temperature to form the partial silyl polymer; and (II) reacting, in a second step:

(IIa) the partial silyl polymer resulting from step (I); and (IIb) the at least one amino silane compound; wherein the second reaction step (II) is carried out at a second predetermined temperature and for a second predetermined period of time at said second temperature to form the final silyl polymer.

8. A process for producing a two-component solvent-based polyurethane retort adhesive composition for producing laminates comprising reacting:

(A) a first component comprising at least one isocyanate component as Component A; and (B) a second component comprising at least one isocyanate-reactive component as Component B; wherein the at least one isocyanate-reactive component, Component B, comprises (Bi) at least one silyl polymer, wherein the silyl polymer is a final silyl polymer comprising the reaction product of (i) a partial silyl polymer; and (ii) at least one amino silane compound to form the final silyl polymer, wherein the partial silyl polymer comprises the reaction product of (a) at least one polyol compound; and (b) at least one iso-silane compound to form the partial silyl polymer.

9. A laminate comprising:

(α) at least one first layer of a film or a substrate; and (β) at least a second layer of a film or a substrate; and (γ) at least one layer of the adhesive composition of claim 1 disposed on at least a portion of the surface of one side of: (1) the at least one first layer (α), (2) the at least one second layer (β), or (3) both the at least one first layer (α), and the at least one second layer (β).

10. A retort article made from the laminate of claim 9.

11. A process of producing a laminate comprising the steps of:

(A') providing: (α) at least one first layer of a film or substrate; (β) at least one second layer of a film or substrate; and (γ) the adhesive composition of claim 1;

(B') applying the adhesive composition (γ) of step (A') to at least a portion of the surface of one side of: (1) the at least one first layer (α), (2) the at least one second layer (β), or (3) the at least one first layer (α), and the at least one second layer (β); wherein the adhesive composition forms an adhesive layer;

(C') combining the first and second layers together with the adhesive layer of step (B') sandwiched between the first and second layers, sufficient to form a multi-layer laminate structure; and (D') curing the multi-layer laminate structure of step (C') to bind the first and second layers together to form a cured multi-layer laminate product.

* * * * *